United States Patent [19]

Bergsneider

[11] Patent Number: 5,533,181
[45] Date of Patent: Jul. 2, 1996

[54] IMAGE ANIMATION FOR VISUAL TRAINING IN A SIMULATOR

[75] Inventor: Carl W. Bergsneider, Silver Lake, Ohio

[73] Assignee: Loral Corporation, New York, N.Y.

[21] Appl. No.: 492,941

[22] Filed: Jun. 21, 1995

Related U.S. Application Data

[63] Continuation of Ser. No. 333,241, Nov. 2, 1994, abandoned, which is a continuation of Ser. No. 179,778, Jan. 10, 1994, abandoned, which is a continuation of Ser. No. 632,577, Dec. 24, 1990, abandoned.

[51] Int. Cl.[6] .................................................. G06T 13/00
[52] U.S. Cl. ......................... 395/152; 348/123; 345/122; 434/43
[58] Field of Search .................................. 395/152–153; 364/410, 424.06; 434/29–51, 14; 348/121–123, 594, 586; 358/450, 452; 273/433–434, 313–316; 345/122, 113–114

[56] References Cited

U.S. PATENT DOCUMENTS

| | | | |
|---|---|---|---|
| 4,572,509 | 2/1986 | Sitrick | 273/85 |
| 4,645,459 | 2/1987 | Graf et al. | 434/43 |
| 4,752,836 | 6/1988 | Blanton et al. | 358/342 |
| 4,767,334 | 8/1988 | Thorne et al. | 434/29 |
| 4,841,291 | 6/1989 | Swix et al. | 340/725 |
| 4,864,289 | 9/1989 | Nishi et al. | 340/725 |
| 4,868,552 | 9/1989 | Chang | 340/721 |
| 4,874,164 | 10/1989 | Miner et al. | 345/187 |
| 4,942,514 | 7/1990 | Miyagaki et al. | 364/190 |
| 4,965,753 | 10/1990 | Kraemer | 364/522 |
| 5,032,917 | 7/1991 | Aschwanden | 358/183 |
| 5,041,992 | 8/1991 | Cunningham et al. | 364/518 |
| 5,051,094 | 9/1991 | Richter et al. | 434/30 |
| 5,117,283 | 5/1992 | Kroos et al. | 358/22 |
| 5,125,671 | 6/1992 | Ueda et al. | 273/437 |
| 5,126,847 | 6/1992 | Kori et al. | 358/183 |
| 5,138,307 | 8/1992 | Tatsumi | 340/721 |
| 5,308,022 | 5/1994 | Cronkhite et al. | 434/14 |

Primary Examiner—Almis R. Jankus
Assistant Examiner—Joseph H. Feild
Attorney, Agent, or Firm—Renner, Kenner, Greive, Bobak, Taylor & Weber

[57] ABSTRACT

A method and apparatus for generating imagery animation in a color video monitor as may be used for visual training. A high resolution photo image of a particular station which is to be the subject for simulation training is generated and it is electronically scanned to produce a digitized photo image of the station. The digitized photo image is edited to remove all images exhibiting dynamic characteristics and the resultant photo image is stored in graphics processor video memory designated for background static object imagery. The removed dynamic object images are rendered and stored in graphics processor video memory designated for foreground dynamic object imagery. The background static and foreground dynamic object imageries are combined in a composite video signal which is applied to a trainee video monitor. Once the background static object imagery is generated in the monitor, only the foreground dynamic object images are manipulated by the graphics processor for real-time imagery animation.

20 Claims, 2 Drawing Sheets

IMAGE ANIMATION FOR VISUAL TRAINING IN A SIMULATOR

This is a continuation of application Ser. No. 08/333,241, filed Nov. 2, 1994, abandoned, which is a continuation of Ser. No. 08/179,778, filed Jan. 10, 1994, abandoned, which is a continuation of prior application Ser. No. 07/632,577, filed Dec. 24, 1990, abandoned.

FIELD OF THE INVENTION

This invention generally pertains to creating imagery animation as may be used for visual training.

More particularly, the present invention pertains to a method and apparatus for creating imagery animation wherein multiple and various background static object imageries of particular equipment configurations are stored in graphics processor memory and a particular one of these is drawn up from memory for use while the dynamic object images necessary for realism and which are indicative of the functional aspects of the equipment are inserted in the foreground and manipulated by the graphics processor for real-time training.

Specifically, the present invention provides a method and combination of apparatus for visual simulator training wherein multiple and various type equipment backgrounds may be created using digitized photo images of the background and storing these in processor memory until needed for a particular training, the specific background imagery being drawn up from memory while rendered dynamic object imagery is super-imposed in the foreground thereover and manipulated by the processor to give a trainee the controls necessary for active and real-time participation in a training session on the particular equipment configuration.

BACKGROUND OF THE INVENTION

It will be recognized by those persons skilled in this art that the present invention may be applied to many and various fields wherein imagery animation is a useful tool for personnel training purposes. However, and not to limit this invention in any way to a particular field of training, the invention will be illustrated and described specifically as it may be applied to aircraft crew member training.

This invention was conceived and developed to address situations wherein (a) several different types of aircraft need to be simulated, or (b) many equipment changes onboard a particular aircraft are done over a short period of time, or (c) aircraft crew member trainees do not require replicated instrumentation of the aircraft for their training. Typically, when trainees require replicated instrumentation, there is little choice but to design a simulator trainer to interface with actual aircraft flight hardware or replicated "look-and-feel" hardware that is particular to that aircraft.

There are, however, situations where trainees may have already been trained to use the equipment onboard the aircraft and they may only require access to the functional aspects of the equipment in order to fulfill mission rehearsal training and/or situation awareness training. There may also be situations where simple familiarization of the instrumentation is required and the trainee does not need to actually "feel" the shape of the buttons and switches but is more intent on learning the functionality of the equipment. There may also be situations where trainees need only low cost training devices and are willing to sacrifice actual switches and knobs in order to gain flexibility as might be the case with maintenance training. These type of situations lend well to a graphics-based simulation.

In the particular situation wherein one may need to quickly reconfigure a trainee station to correspond to the actual aircraft to be flown the next day, such as in mission rehearsal, there would be insufficient time to have the flight hardware replicated equipment installed and checked out prior to any training session. Graphics-based simulation is an attractive solution inasmuch as it allows for software to provide equipment reconfigurability without requiring a major hardware change. This is also true in the situation wherein the aircraft type does not change but the equipment configuration onboard the aircraft changes because this would require an amount of down-time to change over the equipment to reflect the new configuration.

The concept of graphics-based simulation is not new in the art but, various problems exist which are associated with this type of simulation. For example, one of the problems is that the generated images are of such low quality that they do not look realistic enough, to provide satisfactory training. Further, the cost of generating graphics images of complete and detailed instrumentation is very high and there is an insufficient computational capacity in the available graphics processor equipment to draw the complex instrumentation at real-time rates.

In order to solve the problems of multiple equipment configurations and/or rapid equipment updates, a graphics-based simulation is appropriate, but, the additional problems which exist with this type of simulation have to be solved also. To accomplish this, a technique was developed which provides the high quality images necessary for the simulation, and this, using low cost image production processes and in a manner so as not to tax the computational capacity of the available graphics processor equipment.

Firstly, it was found that photo images of the equipment configurations could be utilized in a manner to obtain high quality imagery for simulation. The photo images are comprised of electronically digitized images of the particular aircraft cockpit environment and these retain the correct colors, shadows, and instrumentation details which are necessary for a quality image display. However, a photodigitized image file comprises a large number of color defined pixel elements and these contain no informational content regarding their actual function. For example, a pixel element contains no information as to whether it is part of a dial, a knob, or a light. It is simply a color element at a particular spot. Because of this property, previous graphics-based simulation techniques did not use photo images. Instead, the prior art techniques built up the cockput instrumentation image as a set of functional objects.

This problem with present graphics-based simulation which others did not choose to overcome, is solved by using an available state-of-the-art graphics editing software package and modifying the digitized photo image files to blank out all of the areas which correspond to moving elements. These will include dial needles, switches, buttons, lights, knobs and like "moving" elements. In the-areas where these elements existed, colors corresponding to the background that would have been visible had that particular "moving" element not been positioned there, are "painted" in. This technique can be done on Personal Computer (PC) type equipment and it requires only a little artistic ability to "cut" out the moving parts and/or elements and to "paste" in the correct background color shades. Because this editing is not difficult and may be accomplished by personnel with average training and using inexpensive and commercially available equipment, the cost of obtaining high quality imagery is drastically reduced. A further benefit of this technique is that the overwhelming amount of data with corresponds to cockpit realism is retained through photo-digitized scanning.

To solve the problem of insufficient computational capacity in the graphics processor, a technique is utilized which is readily available in most types of graphics processors. It was recognized that typical graphics processors define their color rendition capability in the number of bits allocated for the three primary CRT colors of red, green, and blue. Most current graphics display programs generate images by defining areas of pixel elements to represent particular shapes and assigning a particular color to that area. The area could be as large as the whole monitor screen or as small as a single pixel element. Shapes could be changed by overwriting the old pixel data with the new shape pixel color data. The problem with this current technique is that it does not lend well to highly dynamic complex imagery since it requires a large capacity of graphics computational power to continuously update all of the changing areas of memory.

To solve this problem, it was determined that one could assign a certain range of colors to the photo-digitized image files which represent the static "non-moving" cockpit information and a certain range of colors to the dynamic "moving" objects of the instrumentation. Because the two ranges of colors are treated completely separately, it is possible that some of the same colors will exist in both of the ranges. The only limitation that is imposed by this technique is that the total number of colors that the graphics processor must address is limited because the total number of bits which define any one particular color are reduced. Since typical cockpit instrumentation tend toward standardization of colors, the amount of realism lost by not being able to create a wide spectrum of colors results in little loss of capability. Thus, by concentrating the color rendition capability of the graphics processor color bits to the shades of color corresponding to the typical colors of aircraft cockpits, it is possible to provide a highly realistic background image while retaining pixel bits for use in generating dynamic foreground imagery. This is also true for many other types of personnel training where instrumentation is an integral part of the training.

Generating the dynamic foreground object imagery is a straightforward and well known technique in the art. The dynamic object images of the instrumentation which were edited out of the photo image are recreated using standard graphics object definition mechanisms. The only new limitation imposed is that the color assignment for an object is limited due to the reduction in the number of color bits assigned to the foreground memory planes of the graphics processor. For most simulation, this results in little loss of realism especially as such pertains to aircraft cockpit simulation since typical dynamic cockpit objects exhibit few different colors. For example, almost all of the moving dial needles found in cockpit instrumentation are bright "white" for visibility reasons.

Creating a combined visual image in a color monitor is accomplished in the graphics processor which downloads the static image files into memory planes allocated for background imagery. The static image files, of course, comprise all of the desired and available cockpit instrumentation configurations which were generated photo images and photodigitized for this purpose. This downloading only occurs once and may only take an amount of time measured in minutes due to the quantity of data being loaded. A background memory file is not addressed again until a new cockpit instrumentation of a different equipment configuration needs to be simulated.

When the simulation is operating in real-time, the graphics processor renders the changing information associated with the dynamic "moving" object images such as dial needles, switches, tumbler legends, lights and like elements, and draws these pixel shapes in the foreground memory planes. Because the background memory planes contain the large majority of complex object images compared to the foreground memory planes, the graphics processor has no problem manipulating a large number of foreground object images in "real-time". Further, the graphics processor is able to manipulate these dynamic object images at very rapid rates since it is not taxed by having to update the data forming the background imagery. Thus, the problem associated with graphics processor computational capacity is solved by this invention.

SUMMARY OF THE INVENTION

It is in accordance with one aspect of the present invention an object to provide imagery animation useful for visual simulation training.

In accordance with another aspect of the invention it is an object to provide a method and combination of apparatus for creating imagery animation for personnel training purposes wherein background static object imagery is separated from foreground dynamic object imagery and only the foreground is manipulated in real-time for training.

In accordance with still another aspect of the present invention it is an object to provide a method and apparatus for visual simulator training wherein various type equipment background environments may be created using digitized photo images of the background and storing these in processor memory, a specific background imagery being drawn up from memory for a particular training while rendered dynamic object imagery is superposed in foreground memory planes and manipulated by the processor to provide active and real-time trainee participation relative to the particular equipment configuration.

These and other aspects and advantages of the invention will be apparent in view of the following detailed specification and which are accomplished by the method and means hereinafter described and claimed.

The various aspects and advantages of the present invention are accomplished in a simulator trainer including (a) a trainee station having a video monitor, (b) a trainer controller, (c) a graphics processor, and (d) a simulation computer wherein imagery animation is generated in the trainee monitor by the method steps of:

providing a photo image of the particular station to be used for simulation training;

electronically scanning the photo image to produce a digitized electronic photo image thereof;

editing the digitized photo image to remove all object images exhibiting dynamic characteristics;

loading the edited photo image into processor video memory designated for background static object imagery;

rendering dynamic object imagery and loading the imagery into processor video memory designated for foreground object imagery;

combining the background static and foreground dynamic object imageries into a composite video signal;

feeding the composite signal to the trainee monitor; and manipulating only the dynamic object imagery in accordance with trainee response signals to the simulation computer.

The various aspects and advantages of the invention are also accomplished in a simulator trainer including (a) a trainee station monitor, (b) a trainer controller, (c) a simulation computer, and (d) a graphics processor wherein imagery animation in the trainee monitor is generated by apparatus comprising in combination:

means to generate a photo image of a particular station which is to be the subject for simulation training;

means to electronically scan the photo image to provide a digitized signal indicative of the photo image;

means to edit the digitized photo image to remove all object images exhibiting dynamic character;

the edited digitized photo image being loaded into graphics processor video memory designated for background static object imagery while rendered dynamic object images are loaded into graphics processor video memory designated for foreground dynamic object imagery; the graphics processor effecting a combination of the background static and foreground dynamic object imageries in a composite video signal which is applied to the trainee monitor and only the dynamic object imagery is manipulated by the graphics processor in accordance with signals received from the simulation computer and trainer controller.

DETAILED DESCRIPTION OF THE INVENTION

Figure 1:
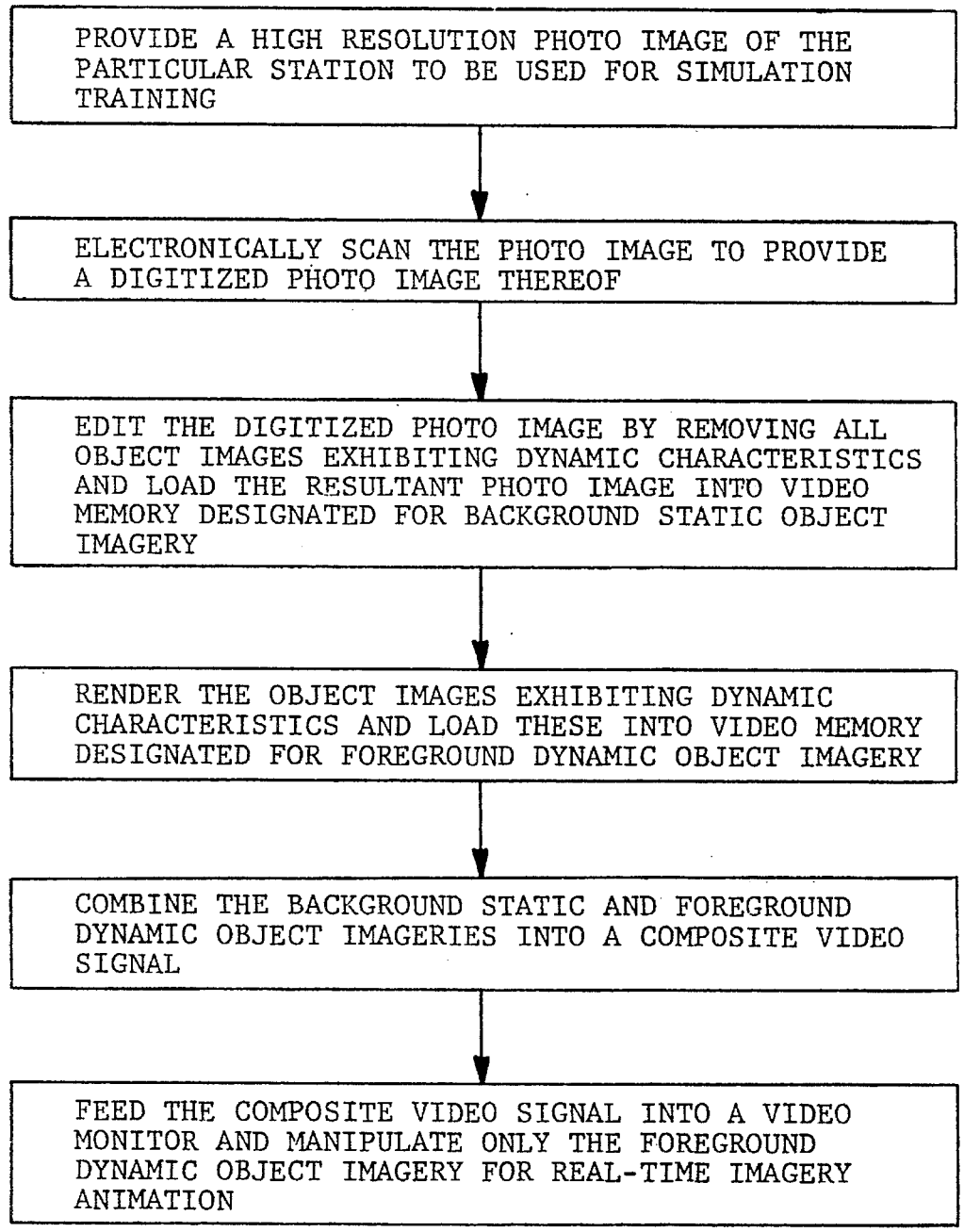
FIG. 1 is a block flow diagram illustrating the method of the present invention.

Referring firstly to FIG. 1 of the drawings, the method of the present invention is illustrated in flow diagramatic format as it may be applied to any type of personnel training which benefits from graphics image animation.

Firstly, an actual station which is to be the subject for personnel training purposes is photographed to produce a high resolution photo image of the instrumentation which a trainee will be required to know in order to function properly at the particular station. It will, of course, be recognized by those knowledgeable and skilled in the photographic arts that the photo image of the station instrumentation may be produced using various type camera equipment. These may include various format still cameras and/or video "camcorder" type equipment. However, many of these do not now possess the resolution required to produce the high quality imagery necessary for realism in this type of application. However, the inventor of this present invention recognizes that the resolutions of the various type equipments may increase as the state-of-the-art of the equipments advance, and, therefore, the present invention is not considered limited by the particular type of equipment used to produce a high quality and high resolution photo image. A particular equipment which may be used effectively is a suitable camera format using 35 mm color print film exhibiting sufficient density and resolution for this purpose such as, for example, a Hasselblad 500 cm camera with a 60 mm lens. This type of equipment provided a very high quality, high resolution photographic color print of station instrumentation which, in life size, exhibited realism to the trainee station scene.

Next, the photographic color print of the station instrumentation is scanned to produce a digitized electronic photo image and this may be accomplished in available equipment such as, for example, a SCANMASTER as produced by Howtek Company of Hudson, N.H.

The electronically digitized photo image is edited to remove all object images which exhibit "moving" or dynamic characteristics. These elements include dial needles, panel lights, switches, buttons, knobs, and any other similar elements found in the station instrumentation. This is accomplished in conventional PC equipment using a state-of-the-art graphics editing software package such as, for example, DIGIPAINT III as produced by the Electronics Arts Company of San Mateo, Calif. In the positions where the dynamic object images were removed, suitable color background shading is inserted with the result being a photo image of the crew station instrumentation comprised solely of background static object imagery.

The electronically digitized photo image comprised of background static object imagery is loaded into the video memory of a graphics processor, which memory is designated for background imagery. A graphics processor of the type suitable for this application may be a CX-2000 as produced by Chromatics, Inc. of Tucker, Ga.

Next, the dynamic object images which were removed from the digitized photo image by editing are recreated and/or rendered using standard and well-known graphics object definition mechanisms such as, for example, a RASPAC graphics object generation/manipulation software package as produced by Celeris, Inc. of Chatsworth, Calif. The dynamic object images are also loaded into the graphics processor, but, into video memory designated for foreground dynamic object imagery. In this manner, the pixel bit definitions for background static and foreground dynamic object imageries are separated in the video memories of the graphics processor.

For a particular training exercise, the graphics processor is instructed by either a simulation computer and/or a trainer controller to provide a video signal to a trainee station monitor where the video of a particular station instrumentation is to be viewed by a trainee. In accomplishing this, the graphics processor combines the background static and foreground dynamic object imageries into a composite video signal which produces the video display in, for example, a 20-by-20 inch color video monitor at the trainee station. However, and contrary to what is done in the prior art, the graphics processor may now use its computational capacity to manipulate only the dynamic object imagery which appears in foreground and overlayed on the background imagery. The manipulations are achieved by signal instructions from a simulation computer and/or trainer controller to provide the trainee with real-time updates of the station instrumentation changes.

Figure 2:
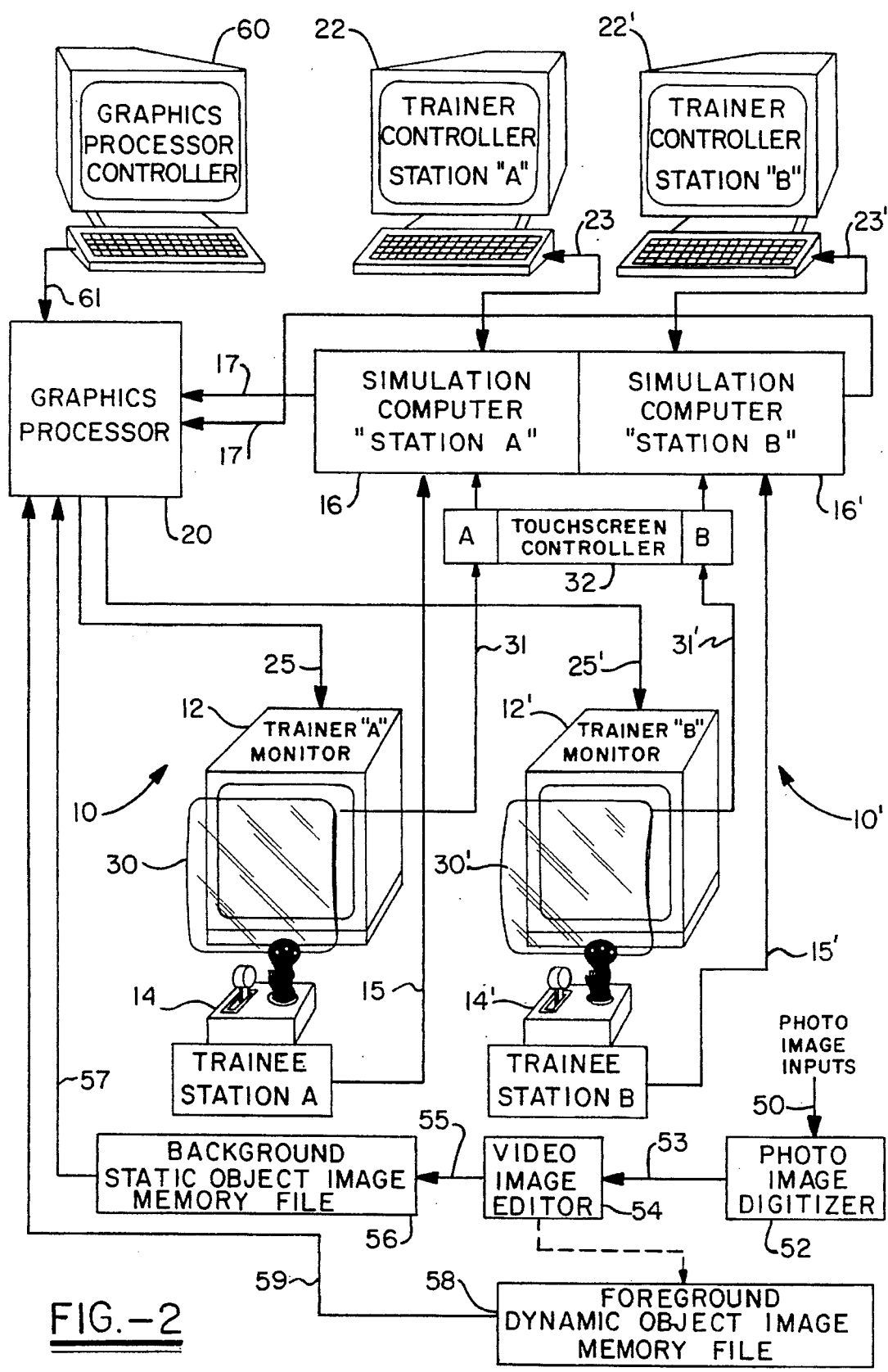
FIG. 2 is a block diagram illustrating a combination of apparatus to achieve the method shown in FIG. 1.

Referring now to FIG. 2 of the drawings, a particular application of the present invention is illustrated. The application is to an aircraft crew training simulator in which various members of the crew may be trained on instrumentation unique to a particular aircraft crew station. For example, FIG. 2 may be applied to the training of an aircraft pilot at a trainee station "A" while the co-pilot may be trained at trainee station "B". Alternatively, the trainee stations "A" and "B" may be designated for co-pilot and flight engineer respectively and, therefore, it is not an important consideration as to what the particular trainee station designations are and/or the number of such trainee stations, suffice to say that each will be designated for a particular type of crew member training. Further and inasmuch as both trainee stations "A" and "B" operate in substantially the same manner, only station "A" will be specifically described. However, trainee station "B" will carry the same reference numerals although "primed" to designate a similar function.

Continuing with reference to FIG. 2, a crew flight trainer is generally indicated by reference numeral 10 and it includes a trainee video monitor 12 which functions to display a color video image of the particular instrumentation for the crew member training at that station. For example, a pilot trainee at station "A" will view instrumentation in the video which is peculiar to the pilot's station onboard the actual aircraft. In addition to the video monitor 12, the trainee station also includes hand controls 14 which a pilot normally uses to control the dynamic functioning of an aircraft. A simulation computer 16 is also provided which accepts response signals 15 from the trainee station controls 14. The simulation computer 16 includes the pre-programmed training exercises which are normally used for this type of training and it sends these signals via line 17 to a graphics processor 20. The graphics processor 20 manipulates the video at the trainee monitor 12 in accordance with signal instructions 17 received from the simulation computer 16. The simulation computer 16 also sends update data to the graphics processor 20 corresponding to the trainee responses received on line 15. Further, the simulation computer 16 receives input signals on line 23 from a trainer controller 22 which functions to change trainee "scenarios" displayed in the trainee monitor 12.

The trainee monitor video display is generated, in accordance with this invention, by first obtaining a high resolution photo image 50 of the actual cockpit hardware instrumentation. This may be, for example, the instrumentation at the pilot's station. The photo image 50 is electronically digitized in an image scanner 52 which provides an output electronic signal 53 which is indicative of a digitized photo image of the cockpit instrumentation. The signal 53 is fed into a PC 54 where the photo image is edited and scaled using an available graphics editing software package. The editing removes from the digitized photo image 53 all object images of the instrumentation which may exhibit dynamic or "moving" character such as, for example, dial needles, switches, knobs, indicator lights, and any other type of element having movement associated with its operation. The editing also includes the insertion of any appropriate shading in those areas of the photo image where dynamic object images have been removed. This results in a digitized photo image comprised solely of static object images of the cockpit instrumentation. Because the original photo image 50 may or may not be captured in "life-size" format, the photo image must be scaled and this is also accomplished in the PC 54. The resultant digitized photo image 55 comprised of only the background static object imagery is fed into a video memory file 56 which is designated for background static object imagery. This memory 56 may or may not be an integral and functioning part of the graphics processor 20. In FIG. 2 it is shown as a separate element having an input 57 feeding into the graphics processor 20.

The dynamic object images which were removed from the digitized photo image in the editing process at the PC 54 are recreated or "rendered" and stored in a video memory file 58. The memory file 58 may also be an integral and functioning part of the graphics processor and/or it may comprise a separate element as shown in FIG. 2. In the latter case, a signal line 59 provides an input into the graphics processor 20.

When it is desired that a training program begin, the graphics processor 20 receives an instruction signal 61 from a controller 60 and the background static and foreground dynamic object imageries are loaded into the processor where they are combined into a composite video signal 25 which is applied to the trainee color video monitor 12. The trainee monitor video display which the pilot sees in front of him is a life-sized reproduction of the actual aircraft cockpit instrumentation. In the training process, the graphics processor 20 manipulates, in real-time, only the foreground dynamic object images in response to signals 17 from the simulation computer 16. The signals 17 may comprise trainee station response signals 15 and/or trainer controller signals 23 for simulation scenario changes as may be desired.

In addition to receiving trainee response signals 15 from the aircraft controls 14, the simulation computer 16 may also receive signals 31 from a touchscreen panel 30 which is mounted to the trainee monitor 12. This allows the pilot trainee to manually enter and manipulate instrumentation controls which he sees in the monitor video display. For example, if the pilot desires to make a dial setting change, he may accomplish this through the touchscreen panel 30. The response is fed to the simulation computer 16 through a touchscreen controller 32 which formats the signal for use in the simulation computer. The simulation computer then sends a signal to the graphics processor 20 which effects a change in the dynamic object image for that dial setting as requested by the pilot.

What is claimed is:

1. In a simulator trainer including (a) a trainee station video monitor providing visual imagery of real-time events, (b) a trainer controller providing signals indicative of various training scenarios, (c) a graphics processor providing video imagery to the trainee video monitor, and (d) a simulation computer responsive to trainer controller and trainee station response signals to provide control signals to the graphics processor, a method of generating imagery animation comprising the steps of:

providing a photo image of an actual station to be simulated, for simulation training;

scanning the photo image to provide a digitized electronic signal indicative of the photo image;

editing the digitized photo image by removing all object images which exhibit dynamic character and inserting background shading in areas where dynamic object images have been removed, generating a static image;

loading the edited digitized static image into a first array of video memory files designated for background static object imagery, said first array having a first specific range of colors assigned thereto;

loading rendered dynamic object images into a second array of video memory files designated for foreground dynamic object imagery, said second array having a second specific range of colors assigned thereto, wherein said first specific range of colors is distinct from said second specific range of colors, and wherein the first array remains unchanged by the graphics processor and is only manipulated by the simulation computer when there is a change in the aircraft being simulated;

combining the background static and foreground dynamic object imageries into a composite video signal;

feeding the composite video signal into the trainee video monitor to provide background static object imagery and overlaying foreground dynamic object imagery; and manipulating by the graphics processor only the foreground dynamic object imagery in accordance with simulation computer control signals, wherein the trainer controller functions to change training scenarios represented by the foreground dynamic object imagery corresponding to trainee responses received by the simulation computer, and wherein the background static and foreground dynamic object imageries employed in the training scenario are reconfigurable by the trainer controller for object imageries peculiar to an actual aircraft.

2. The method as set forth in claim 1 wherein the photo image comprises a color print photograph of the particular station.

3. The method as set forth in claim 2 wherein the photo image comprises a 35 mm color print photograph of the particular station.

4. The method as set forth in claim 1 wherein the edited digitized photo images and the rendered dynamic object images are loaded into video memory files of the graphics processor.

5. The method as set forth in claim 4 wherein the edited digitized photo images are loaded into graphics processor video memory files designated for background static object imagery and the rendered dynamic object images are loaded into separate video memory files designated for foreground dynamic object imagery.

6. The method as set forth in claim 1 wherein the editing also comprises scaling of the photo image to produce a life-sized video image in the trainee video monitor.

7. In an aircraft simulator trainer for crew member training including (a) a trainee station video monitor providing visual imagery of real-time events, (b) a trainer controller providing signals indicative of various aircraft training scenarios, (c) a graphics processor providing video imagery to the trainee video monitor, and (d) a simulation computer having programmed training exercises and responsive to trainer controller and trainee station response signals to provide control signals to the graphics processor, a method of generating imagery animation in the trainee monitor comprising the steps of:

providing a photo image of an actual aircraft cockpit station instrumentation which is to be simulated as the subject for simulation training;

electronically scanning the photo image to provide a digitized electronic photo image thereof;

editing the digitized photo image by removing all object images exhibiting dynamic character and inserting background shading to those areas where dynamic object images have been removed, generating a static image;

loading the edited digitized photo image into a first array of video memory of the graphics processor designated for background static object imagery, said first array having a first specific range of colors assigned thereto;

loading rendered dynamic object images into a second array of video memory of the graphics processor designated for foreground dynamic object imagery, said second array having a second specific range of colors assigned thereto, wherein said first specific range of colors is distinct from said second specific range of colors, and wherein the first array remains unchanged by the graphics processor and is only manipulated by the simulation computer when there is a change in the aircraft being simulated:

combining the background static and foreground dynamic imageries into a composite video signal;

feeding the composite video signal to the trainee video monitor to provide background static object imagery and overlaying foreground dynamic object imagery; and manipulating only the foreground dynamic object imagery in accordance with simulation computer control signals, wherein the trainer controller functions to change training scenarios represented by the foregoing dynamic object imagery corresponding to trainee responses received by the simulation computer, and wherein the background static and foregoing dynamic object imageries employed in the training scenario are reconfigurable by the trainer controller for instrumentation peculiar to an actual aircraft.

8. The method as set forth in claim 7 wherein the photo image comprises a color print photograph of a pilot's cockpit instrumentation.

9. The method as set forth in claim 8 wherein the photo image comprises a 35 mm color print photograph.

10. The method as set forth in claim 7 wherein the simulator trainer also includes a touch-screen panel mounted to the trainee video monitor, wherein the simulation computer is responsive to signals generated from the touch-sceen panel by a trainee entering changes to the video monitor imagery.

11. The method as set forth in claim 7 wherein the editing also comprises scaling of the photo image to produce a life-sized video image in the trainee video monitor.

12. In a simulator trainer including (a) a trainee station video monitor providing visual imagery of real-time events, (b) a trainer controller providing signals indicative of various training scenarios, (c) a graphics processor providing video imagery to the trainee station monitor, and (d) a simulation computer having programmed training exercises and responsive to trainer controller and trainee station response signals to provide control signals to the graphics processor, apparatus for generating imagery animation in the trainee station video monitor comprising in combination:

means to generate a photo image of an actual station which is to be simulated as the subject for simulation training;

means to scan the photo image and provide a digitized electronic signal indicative of the photo image;

means to edit the digitized photo image to remove all object images exhibiting dynamic character; and means to render the dynamic object images which were removed by editing the digitized photo image;

said edited digitized photo image being loaded into video memory of the graphics processor designated for background static object imagery and assigned a first specific range of colors, while the rendered dynamic object images are loaded into video memory of the graphics processor designated for foreground dynamic object imagery and assigned a second specific range of colors different from the first specific range of colors, said graphics processor effecting a combination of the background static and foreground dynamic object imageries where the processing time of the graphics processor is reduced by limiting the background static and foreground dynamic imageries to their respective specific color ranges and where the combination is in the form of a composite video signal which is applied to the trainee station video monitor and only the dynamic object imagery is manipulated by the graphics processor in accordance with control signals from the simulation computer, wherein the trainer controller functions to change training scenarios represented by the foreground dynamic object imagery corresponding to signals generated by a plurality of hand controls input by a trainee and received by the simulation computer and wherein the background static and foreground dynamic object imageries employed in the programmed training exercises are reconfigurable by the trainer controller to represent particular scenarios.

13. The apparatus according to claim 12 wherein the means to generate a photo image comprises a camera formated for color print film to provide a high resolution color photo.

14. The apparatus according to claim 13 wherein the means to generate a photo image comprises a camera formated for 35 mm color print film to provide a contact color print of the particular station.

15. The apparatus according to claim 12 wherein the means to edit also inserts shading in the areas where dynamic object images are removed and scales the resultant photo image to produce a life-sized video image in the trainee video monitor.

16. In an aircraft simulator trainer for crew member training including (a) at least one trainee station having a video color monitor providing visual imagery of real-time events, (b) a trainer controller providing a signal's indicative of various aircraft training scenarios, (c) a graphics processor providing video imagery to the at least one trainee station video monitor, and (d) a simulation computer having programmed training exercises and responsive to trainer controller and trainee station response signals to provide control signals to the graphics processor, apparatus for generating imagery animation in the trainee station video monitor comprising in combination:

means to generate a high resolution photo image of an actual aircraft cockpit station which is to be simulated as the subject for simulation training;

means to electronically scan the photo image to generate a digitized electronic signal indicative of the photo image;

means to edit the digitized photo image to remove all object images which exhibit dynamic characteristics;

said edit digitized photo image being loaded into video memory of the graphics processor designated for background static object imagery and assigned a first specific range of colors, while the rendered dynamic object images are loaded into video memory of the graphics processor designated for foreground dynamic object imagery and assigned a second specific range of colors different from the first specific range of colors and the graphics processor effects combining of the background static and foreground dynamic object images into a composite video signal where the processing time of the graphics processor is reduced by limiting the background static and foreground dynamic imageries to their respective specific color ranges and where the composite video signal is applied to the trainee station video monitor and only the foreground dynamic object imagery is manipulated by the graphics processor in accordance with control signals from the simulation computer, wherein the trainer controller functions to change the composite video signal corresponding to signals generated by a plurality of hand controls input by a trainee and received by the simulation computer, and wherein the composite video signal employed in the aircraft training scenarios to represent an aircraft cockpit station.

17. The apparatus according to claim 16 wherein the means to generate a high resolution photo image comprises a camera formated for color print film to provide a contact color print of the cockpit station.

18. The apparatus according to claim 17 wherein the camera is formated for 35 mm color print film.

19. The apparatus according to claim 16 wherein the simulator trainer also includes a touchscreen panel mounted to the trainee video monitor and wherein the simulation computer is responsive to signals generated by a crew member trainee from the touchscreen panel via a touchscreen controller which is connected to the simulation computer.

20. The apparatus according to claim 16 wherein the means to edit also inserts shading in the areas where dynamic object images are removed and scales the resultant photo image to produce a life-sized video image in the trainee video monitor.

* * * * *